Patented June 29, 1943

2,322,821

UNITED STATES PATENT OFFICE 2,322,821

PARTIAL ESTERS OF ETHERS OF POLY-HYDROXYLIC COMPOUNDS

Kenneth R. Brown, Tamaqua, Pa., assignor to Atlas Powder Company, Wilmington, Del., a a corporation of Delaware No Drawing. Application June 22, 1940,
Serial No. 341,903

18 Claims. (Cl. 260—345)

The present invention relates to partial esters of ethers of polyhydroxylic compounds and more particularly to long chain fatty acid esters of ethers derivable from hexitols.

An object of the invention is to provide long chain fatty acid mono-esters of hexides.

Another object is to provide compositions of matter comprising long chain fatty acid mono-esters of polyhydroxylic compounds including cyclic inner ethers of hexitols and hexane pentols and the external ethers or polyethers thereof.

A further object of the invention is to provide compositions of matter in which long chain fatty acids are combined with polyhydroxylic compounds of the class named in the ratio of substantially 1 equivalent of acid to each 6 carbon atoms of the polyhydroxylic compounds and in which the composition has a ratio of hydroxyl value to ester value of from about 0.5 to 2.0.

The compounds and compositions contemplated by the present invention are characterized by a valuable degree of surface activity rendering them suitable for use as emulsifiers and for other purposes of general usefulness in the arts.

Products of this invention having hydroxyl value to ester value ratios in the lower region of the range disclosed have good solubility in vegetable oils, for example corn oil, and sesame oil, and hence are applicable, among other uses, to the preparation of emulsions of oil soluble medicinal ingredients such as vitamins, vitamin extracts and vitamin concentrates, which are desirably incorporated in an oily vehicle and then dispersed in water for use.

Another useful characteristic of these compounds and compositions is their property as emulsifiers of forming stable emulsions in the presence of strong electrolytes. Their tolerance to electrolytes renders these emulsifiers especially useful in certain cosmetic emulsions where it is desired, for example, to include aluminum chloride to form an anti-perspirant, or calcium sulfide to make a depilatory.

The esters of the present invention involve the monomeric and polymeric cyclic inner ethers of hexitols or the monomeric and polymeric cyclic inner ethers of mixtures comprising hexitols and related polyhydroxylic materials such as hexane pentols. Among the hexane pentols, the saccharitols are important. The term "saccharitols" designates a series of hexane pentols which can be considered as derivable from the saccharinic acids by exchange of carboxyl for carbinol. The formation of the ethers from the polyhydric alcohols involves dehydration which may be accomplished by heating and driving off water. The splitting off of water from 2 hydroxyls attached to polyhydric alcohols can proceed both internally and externally. In internal etherification where the two hydroxyls are both attached to the same molecule of polyhydric alcohol, formation of the ether link leads to oxido or carbon-oxygen rings. Where the disposition of the hydroxyl groups allows the formation of rings having four to seven members, as is the case with the hexitols, then internal etherification to produce cyclic internal ethers is, in general, the preferred reaction.

This internal ether formation can proceed in two stages with the formation of one or two carbon-oxygen rings giving rise to mono- or dianhydro products. In the case of hexitols these may be called generally hexitans and hexides; for example, sorbitan, mannitan, and dulcitan, and sorbide, mannide and dulcide. Examples of such possible ring structures are given herewith:

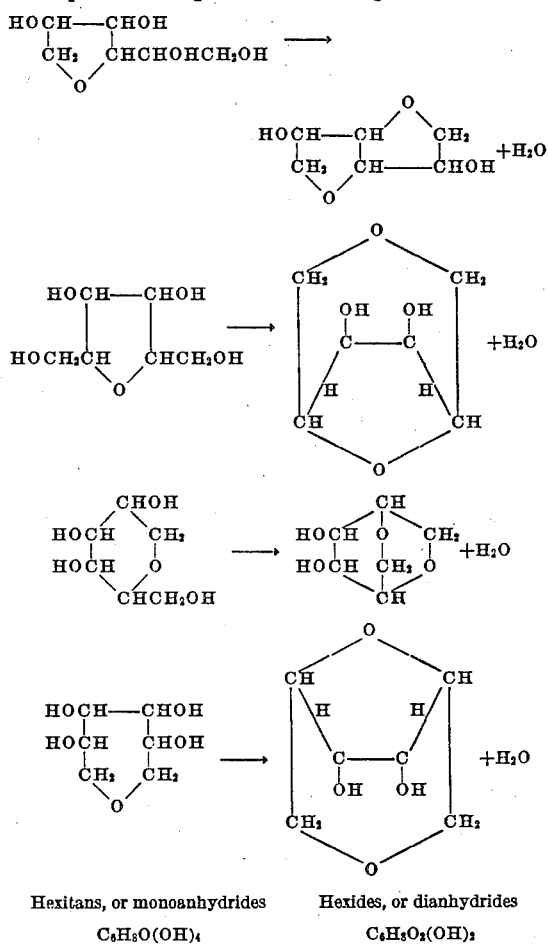

Hexitans, or monoanhydrides     Hexides, or dianhydrides

C₆H₈O(OH)₄                      C₆H₈O₂(OH)₂

In addition to internal etherification, external etherification can take place. Since this is a bimolecular reaction involving 2 molecules instead of the one molecule concerned in internal etherification, this external etherification tends to proceed to a lesser extent and becomes of importance principally when the internal condensation becomes difficult or impossible.

The hexane pentols can give series of mono- and dianhydro products or cyclic inner ethers analogous to those of the hexitols, although one hydroxyl poorer; for example:

$$C_6H_9(OH)_5 \rightarrow C_6H_9O(OH)_3 + H_2O$$
$$C_6H_9O(OH)_3 \rightarrow C_6H_9O_2(OH) + H_2O$$

The hexane pentols or their anhydro products or inner ethers can likewise undergo external etherification to give polymeric products. Where hexane pentols (particularly saccharitols) and hexitols are dehydrated together, external etherification can take place between the anhydrides of the hexane pentols and of the hexitols.

Since this linking of two inner ethers by ether oxygen produces a doubling of the molecules, such compounds may be termed dimeric inner ethers as opposed to the monomeric. The term "polymeric" used herein includes dimeric and also ethers formed by linking more than two inner ether molecules. The terms "polymeric" and "dimeric" are used throughout this application to include external ethers of both identical and different inner ethers.

The fatty acid which enters into the formation of the esters of the present invention is preferably one having six or more carbon atoms, such as the long chain saturated or unsaturated acids of animal and vegetable oils and fats, and the equivalents of such fatty acids such as synthetically prepared aliphatic monocarboxylic fatty acids, as for instance margaric acid, or fatty acids prepared by suitably oxidizing hydrocarbons.

The ethers just described can be esterified, as by means of an acid chloride, the reaction being carried out in pyridine or other anhydrous basic medium to neutralize the hydrochloric acid formed.

Example 1

14.6 g. (0.10 mol) crystalline sorbide with a melting point of 62° C., obtained by heating sorbitol until 2 mols of water of dehydration were removed, were dissolved in 40 g. dry pyridine and treated at 30° C. with 12 g. (less than 0.10 mol) lauroyl chloride. The acid chloride was added dropwise to the solution. The product was cooled to 5° C. and plunged into iced water. The precipitate was then treated with a dilute NaHCO3 solution, washed with water, and crystallized from alcohol. The first crop of crystals that came out was discarded as it contained a substantial amount of the dilaurate. The second crop of crystals was filtered and recrystallized from alcohol. This second product melted at 50–52° C. and had the following analytical values:

Acid number_____ Neutral
Hydroxyl value_____ 168 (Theory 173)
Ester value_____ 171 (Theory 173)

The product thus obtained was sorbide monolaurate. From the proportions of acid chloride and sorbide used, it will be seen that the ratio of acid to carbon atoms is just slightly less than 1 mol of acid to 6 carbon atoms of the inner ether. The ratio hydroxyl value to ester value is 168/171 or 0.98.

The product of Example 1, which is necessarily rather expensive to produce, is only one embodiment of my invention though desirable where a high degree of chemical purity and homogeneity are needed.

However, for many purposes preformation of the inner ether can be dispensed with and the fatty acids reacted directly with the parent polyhydric alcohols.

Thus, a hexitol, for example, sorbitol, mannitol, or dulcitol, is reacted with a fat or oil acid, under conditions which promote not only esterification, but also etherification. For instance, the hexitol and fatty acid are reacted in about a mol for mol ratio until substantially three mols of water have been eliminated and the resulting esterified product has the hydroxyl value and ester value corresponding approximately to those of the mono-esters of a dianhydro hexitol, or hexide.

In general the reaction can be conducted advantageously by heating the reactants at 200–250° C. for 1 to 3 hours in the presence of a catalyst preferably an acid catalyst like phosphoric or sulfuric acid or potassium bisulfate, or a basic catalyst, such as sodium hydroxide, sodium carbonate, potassium carbonate and the like. The optimum conditions for a particular reaction are dependent, of course, upon the particular combination of reactants, catalyst, temperature, etc. The reaction will take place without a catalyst but it is preferable to operate with one and especially with an acid catalyst.

When hexitols are the starting materials and the reaction is carried out as described above the resulting product is usually much more complex than those obtained from the preformed hydroxy ethers.

Thus, when hexitols are heated with one mol of fatty acid under esterifying and etherifying conditions, the following typical reactions take place, although not necessarily in the order given:

1. Loss of one mol of water internally from the hexitol to give a mixture of monoanhydrides or hexitans.

$$C_6H_8(OH)_6 \rightarrow C_6H_8O(OH)_4 + H_2O$$

2. Loss of a second mol of water from one or more of the hexitans formed to give a dianhydro hexitol or hexide:

$$C_6H_8O(OH)_4 \rightarrow C_6H_8O_2(OH)_2 + H_2O$$

3. Esterification of the hexitans or hexides by the fatty acid with loss of a further mol of water:

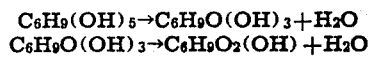

4. External etherification between two hexitan monoesters, or two hexide monoesters, or a hexitan and a hexide monoester with further loss of water to give dimeric cyclic inner ether esters:

$$2C_6H_8O(OH)_3OCOR \rightarrow (RCOOC_6H_8O(OH)_2)_2O + H_2O \quad (c)$$
$$2C_6H_8O_2(OH)OCOR \rightarrow (RCOOC_6H_8O_2)_2O + H_2O \quad (d)$$

$$C_6H_8O_2(OH)OCOR + C_6H_8O(OH)_3OCOR \rightarrow$$
$$RCOOC_6H_8O_2-O-C_6H_8O(OH)_2OCOR + H_2O \quad (e)$$

Accordingly, when the reaction is carried out as described, by the time 3 mols of water have been lost the principal product will be a mixture of hexide monoesters, (b), but in addition there will be some hexitan monoesters (a), and some polymeric inner ether esters (c, d, and e). There will also be, as minor impurities, unesterified hydroxylic materials and free fatty acids which may be removed if desired.

Instead of starting with a pure hexitol or mixture of hexitols, I may also use the readily available mixture of sorbitol and other polyhydric alcohols described in my U. S. Patent No. 2,172,357. These comprise hexitols and 6-carbon, 5-hydroxy polyhydric alcohols known as saccharitols. Since in such a mixture of polyhydric alcohols, there is a plurality of saccharitols in addition to one or more hexitols, it is evident that the over-all reaction is a highly complex one.

This complexity of product is a very desirable feature of my invention since, compared to the simple hexide monoesters, the complex products show improved surface activity, less crystallizing tendency, and where high-melting fatty acids are attached, generally a lower titer of the finished ester. It will be understood that even where a pure hexitol, such as mannitol, is used as the alcoholic reactant, in the esterification reaction under etherifying conditions a complex mixture of esters of monomeric and polymeric cyclic inner ethers results.

Whereas the foregoing explanation is considered to be a true picture of the reactions involved in producing my compounds and compositions, it is given merely by way of explanation and my invention is not to be taken as limited to any particular theory of the reactions. I have found that the most desirable products are obtained when the reaction is so conducted that on an average the hydroxyl and ester values of the resulting product are substantially those corresponding to a hexide monoester. In this case the ratio of the hydroxyl value to the ester value is one, that is:

$$\frac{\text{Hydroxyl value}}{\text{Ester value}} = \frac{\text{grams KOH equivalent to hydroxyl}}{\text{grams KOH equivalent to combined acid}} =$$

$$\frac{1 \text{ equivalent KOH}}{1 \text{ equivalent KOH}} = 1$$

Due to the incidence of side reactions as shown above, the range of useful products contemplated by my invention will be found to have values for the ratio of hydroxyl to ester of 2.0 to 0.5.

Since, when using stoichiometric proportions, the initial ratio of acid equivalent to carbon atoms of the polyhydroxylic material is 1/6, and since the etherification and esterification processes involve only the loss of water with no loss of carbon, the ratio of acid equivalents to atoms of polyhydric residue carbon in the product is still 1/6, regardless of the extent of internal or external etherification. While the preferred ratio of acid equivalents to polyhydroxylic carbon atoms is 1/6 or 0.166, useful products may be obtained having ratios of somewhat less than 0.16, preferably not below about 0.15, and also ratios somewhat higher than 0.16, preferably not over 0.25.

Instead of starting with the hexitols or mixed polyhydric alcohols, I may use preformed mono- or dianhydrides of hexitols or hexane pentols. When starting with the hexides, I may carry out the esterification under nonetherifying conditions such as by using the acid chloride and pyridine or any other suitable base to neutralize the hydrochloric acid, as described hereinbefore, or I may use the acid anhydride in place of the acid chloride. Esterifying a hexide in this manner gives only monomeric hexide esters. I may also react hexitols or mixtures thereof comprising saccharitols, with mineral acids, or under etherifying conditions in the absence of organic acid, purify the resulting mixture of mono- and polymeric inner ethers thus obtained with decolorizing carbon or other methods, and then esterify the resulting mixture of hydroxylic ethers with the fatty acid under nonetherifying conditions.

The following examples illustrate the preparation of several compositions in accordance with the invention, starting with hexitols, or hexitol containing mixtures, and reacting them with organic acids under etherifying conditions. The invention is not, however, limited to the particular compounds produced by the examples or by the processes by which they are produced. It will be understood throughout that other hexitols or mixtures of hexitols with saccharitols can be substituted for those employed in the examples.

*Example 2*

182 g., dry basis, of technical sorbitol syrup, with solids comprising about 80% sorbitol and the remainder non-sorbitol polyhydroxylic materials, largely saccharitols, were placed in a flask and adjusted to a pH of 2.0 by the addition of 2.0 cc. of 85% $H_3PO_4$. To the resulting material were added 216 g. of distilled coconut oil fatty acids having an acid number of 275 and containing approximately 60% of lauric acid. This quantity of coconut oil fatty acid was 1.054 times the equivalent weight of fatty acid, the 5.4% excess of acid being used to compensate for acids distilled during the reaction. The reactants were heated together with agitation in an inert atmosphere of carbon dioxide for a total of two and one-half hours at 225° C. The reaction mixture had become uniformly clear in appearance after two hours at 225° C. and was then given a decolorizing treatment with a commercial activated carbon known as "Darco G-60." This treatment consisted in adding 2% Darco based on the total weight of the charge during the last half-hour of the heating at 225° C. The mixture was subsequently filtered free of carbon.

The product was an oily liquid having the following properties:

Hydroxyl value _____ 205
Ester value _____ 170
Viscosity at 25° C_____centipoises__ 439

The product was largely composed of the sorbide monoesters of coconut oil fatty acids together with small amounts of sorbitan esters and other ether-esters. It was a reddish yellow oil having a color of 60 units when read on a Hess-Ives tint photometer using a 6 mm. cell.

This material proved especially useful in the preparation of emulsions made in the presence of electrolytes such as water-in-oil emulsions where aluminum chloride or aluminum sulfate was present in the emulsion mixture, and oil-in-water emulsions containing electrolytes such as citric acid.

*Example 3*

3185 g. (17.5 mols) technical sorbitol syrup (of the type used in Example 2) measured on a dry basis were adjusted to a pH of 2.0 by the addition of 24 cc. 85% $H_3PO_4$. This syrup was then reacted with 4970 g. (about 17.5 mols) of triple-pressed stearic acid in an inert atmosphere of carbon dioxide for three hours twenty-five minutes at 245° C. The product was treated with 2% of its weight of activated carbon (Darco G-60) for one-half hour at 200° C. and subsequently filtered free of carbon. It was then deodorized for two hours at 140° C. by means of superheated steam and subjected to a second 2%

Darco treatment. The final product had a color of 89 units as measured in a 6 mm. Hess-Ives tint photometer cell, and the following analytical values:

| | |
|---|---|
| Acid number | 4.5 |
| Hydroxyl value | 218 |
| Ester value | 135.5 |
| Melting point °C | 42–43 |

The ester portion was composed principally of sorbide monoesters of triple-pressed stearic acid and the remainder of sorbitan and other ether-esters of triple-pressed stearic acid.

Example 4

114 g. (about 0.5 mol) of commercial myristic acid and 91 g., dry basis, (0.5 mol) technical sorbitol syrup (as in Example 2) which had been adjusted to a pH of 1.8 by the addition of $H_3PO_4$ were reacted for a period of one hour at 210° C. The reaction mixture was given an additional half-hour heating treatment at 210° C. in the presence of 2% Darco G-60 decolorizing carbon and was subsequently free of the carbon. The product had a color of 60 Hess-Ives units as read directly in a 6 mm. Hess-Ives tint photometer cell. The product had the following analytical values:

| | |
|---|---|
| Acid number | 6 |
| Hydroxyl value | 180 |
| Ester value | 161 |

The product comprising principally sorbide monomyristate was an excellent emulsifier. A 1% solution of the myristate in corn oil reduced the interfacial tension between this corn oil and water from 22.2 dynes cm. to 2.6 dynes/cm.

Example 5

182 g. of technical sorbitol syrup (as in Example 2) adjusted to a pH of 1.6 by the addition of 4 g. potassium bisulfate were reacted with 218.7 distilled coconut oil fatty acids (acid number 270) for three and one-half hours at 200–225° C. The product was given a Darco G-60 decolorization treatment employing 2% carbon based on the weight of the reaction mixture. The reaction product was a yellow oil having the following analytical values:

| | |
|---|---|
| Acid number | 13 |
| Hydroxyl value | 187 |
| Ester value | 165 |
| Setting point | 3–4° |
| Viscosity at 25° C centipoises | 299 |

The product consisted chiefly of sorbide monoesters of distilled coconut oil fatty acids.

Example 6

335 g. distilled coconut oil fatty acids were reacted with 285 g. mannitol in the presence of 1.71 cc. 85% $H_3PO_4$ for a total of two and one-quarter hours at 235° C. During the last half-hour at 235° C. the reaction mixture was given a Darco G-60 decolorizing treatment employing 2% Darco based upon the reactant weight. The reaction mixture was cooled to 180° C. and filtered free of carbon. The product was a reddish oil having a color of 70 Hess-Ives units as measured directly in a 6 mm. Hess-Ives tint photometer cell and had the following analytical values:

| | |
|---|---|
| Acid number | 5 |
| Hydroxyl value | 180 |
| Ester value | 165 |

The product was composed chiefly of the mannide monoesters of the distilled acids derivable from coconut oil.

Example 7

378 g. (about one and one-third mols) triple-pressed stearic acid were reacted with 242 g. (about one and one-third mols) mannitol in the presence of 0.55 cc. 85% $H_3PO_4$ for a total of four hours at 245° C. During the last half-hour at 245° C. the reaction mixture was given a 2% Darco G-60 decolorizing carbon treatment. The product was cooled to 180° C. and filtered free of carbon. The product was a yellow solid having the following analytical values:

| | |
|---|---|
| Acid number | 4 |
| Hydroxyl value | 170 |
| Ester value | 138 |
| Melting point ° C | 41–42 |

Example 8

182 g. mannitol (1 mol) and 284 g. stearic acid (1 mol) were reacted in the presence of 0.40 cc. 85% $H_3PO_4$ for three and one-half hours at 235° C. The reaction product obtained was a yellowish-brown wax having the following analytical values:

| | |
|---|---|
| Acid number | 5 |
| Hydroxyl value | 180 |
| Ester value | 140 |
| Melting point ° C | 45 |

The product consisted chiefly of the mannide monoesters of the acids present in triple-pressed stearic acid together with some mannitan monoesters.

Example 9

438 g. of white olein, representing about 1.5 mols oleic acid, were reacted with 273 g. (1.5 mols) mannitol in the presence of 1.64 cc. 85% $H_3PO_4$. The reaction was carried out in a glass flask equipped with an agitator, a carbon dioxide inlet tube to permit the use of an inert atmosphere and an inverted U air condenser. The reactants were heated with agitation in an inert atmosphere of carbon dioxide for one and one-half hours at 220–225° C. after which time the reaction mixture became uniformly clear in appearance. The product was given a 2% Darco G-60 treatment at this time and the heating continued for an additional half-hour at 220–225° C. The product was filtered free of carbon. It was a reddish yellow oil having a color of 130 Hess-Ives units as measured directly in a 6 mm. Hess-Ives tint photometer cell and having the following analytical values:

| | |
|---|---|
| Acid number | 7 |
| Hydroxyl value | 150 |
| Ester value | 145 |
| Viscosity at 25° C centipoises | 1200 |

The product was composed chiefly of mannide monooleate.

Example 10

An ester of low hydroxyl number which has very good solubility in vegetable oils was prepared as follows:

45.4 pounds white olein, which comprises mainly oleic acid, having an acid number of 197, were reacted with 21.4 pounds, dry basis, technical sorbitol syrup (as in Example 2) at 265° C. for 2½ hours in the presence of 53.0 cc. $H_3PO_4$ (85% concentration). This is a ratio of about 1.45 mols oleic acid to 1 mol sorbitol. During the last hour at 265° C. the charge was treated with 4% of its weight of Darco G-60 decolorizing carbon. The charge was cooled to 80° C. and filtered through a filter press. The product was a fluid oil having a color of 26 Hess-Ives units as measured in a 6 mm. Hess-Ives tint photometer cell and had the following analytical values:

Acid number _____ 5.6
Hydroxyl value _____ 100
Ester value _____ 160

Due to the fact that somewhat more than one mol of acid is reacted with each mol of sorbitol, the product comprised an appreciable amount of sorbide di-esters in addition to the sorbide mono-esters which formed the greater part of the product.

The above product gave transparently clear solutions in vegetable oils such as corn and sesame oils.

*Example 11*

2 g. of the product of Example 6 were dissolved in a mixture of 28 g. petrolatum and 10 g. beeswax at 70° C. 20 g. aluminum chloride (hydrated) were dissolved in 40 g. water and the solution heated to 70° C. The solution of aluminum chloride was added to the petrolatum mix and the mixture stirred mechanically until it had cooled to room temperature. The resulting emulsion was of the water-in-oil type and was very useful as a perspiration inhibitor and deodorant. If desired, the beeswax in the above emulsion may be replaced by paraffin wax, or may be replaced by the use of additional quantities of petrolatum.

If desired, the aqueous phase may have dissolved therein any other suitable electrolyte, as, for example, aluminum sulfate, sodium sulfate, boric acid, borax or salicylic acid; or the aqueous phase may have suspended therein less water-soluble electrolytes such as calcium sulphide, calcium hydroxide or the like. The emulsions employing solutions or suspensions in the aqueous phase may be employed for a variety of purposes. Thus the emulsions having calcium sulfide or calcium hydroxide suspended in the aqueous phase are highly useful as depilatory preparations.

*Example 12*

1 part of the product of Example 9 was dissolved in nine parts of petrolatum by mixing while warm. To 10 parts of the composition so-formed water was added in small portions. During the addition of water the composition was emulsified by stirring with a spatula. By this test it was found that 90 parts of water could readily be emulsified with 10 parts of the petrolatum-ester composition. The emulsions so-formed when examined 19 days later still remained stable. It was an emulsion of the water-in-oil type.

*Example 13*

38 parts of petrolatum were melted and held at about 70° C. at which time 2 parts of the product of Example 2 were admixed with stirring. 20 parts of sodium sulfate were dissolved in 40 parts water and the solution raised to about 70° C. The sodium sulfate solution was then added slowly to the oil while constantly stirring the latter. There resulted a smooth emulsion which was quite stable even after long standing. In place of sodium sulfate other electrolytes such as aluminum sulfate can be employed.

The preceding examples are set out solely for the purpose of illustration and it will be appreciated that the invention is not restricted thereto. The compounds and compositions produced by the processes of the examples can be made by other steps as will be apparent to those skilled in this art.

This application is a continuation-in-part of my application Serial Number 252,548, filed January 24, 1939.

The invention is to be taken as limited only by the scope of the following claims.

I claim:

1. A hexide monoester of a fatty acid having at least 6 carbon atoms.

2. A mannide monoester of a fatty acid having at least 6 carbon atoms.

3. A sorbide monoester of a fatty acid having at least 6 carbon atoms.

4. A composition consisting essentially of a mixture of hexide monoester of a fatty acid having at least 6 carbon atoms and the other esters produced in the reaction of a polyhydroxylic material selected from the group consisting of hexitols, hexitans, hexides, and mixtures of hexitols and hexane pentols, and the said fatty acid with at least 6 carbon atoms, said mixture having a ratio of fatty acid equivalents to carbon atoms of polyhydroxylic residue of from about 0.15 to 0.25, and the ratio of hydroxyl value to ester value of said mixture being from about 0.5 to 2.0.

5. A composition consisting essentially of a mixture of hexide monoester of a fatty acid having at least 6 carbon atoms and the other esters produced in the anhydridization-esterification reaction of a polyhydroxylic material selected from the group consisting of hexitols, hexitans, and mixtures of hexitols and hexane pentols, with said fatty acid with at least 6 carbon atoms, at elevated temperature and in the presence of an acidic catalyst, said mixture having a ratio of fatty acid equivalents to carbon atoms of polyhydroxylic residue of from about 0.15 to 0.25, and the ratio of hydroxyl value to ester value of said mixture being from about 0.5 to 2.0.

6. A composition consisting essentially of a mixture of mannide monoester of a fatty acid having at least 6 carbon atoms and the other esters produced in the anhydridization-esterification reaction of mannitol and the said fatty acid with at least 6 carbon atoms under conditions promoting both esterification with said acid and anhydridization of said mannitol, said mixture having a ratio of fatty acid equivalents to carbon atoms of mannitol residue of from about 0.15 to 0.25, and the ratio of hydroxyl value to ester value of said mixture being from about 0.5 to 2.0.

7. A composition consisting essentially of a mixture of sorbide monoester of a fatty acid having at least 6 carbon atoms and the other esters produced in the anhydridization-esterification reaction of sorbitol and said fatty acid with at least 6 carbon atoms under conditions promoting both esterification with said acid and anhydridization of said sorbitol, said mixture having a ratio of fatty acid equivalents to carbon atoms of sorbitol residue of from about 0.15 to 0.25, and the ratio of hydroxyl value to ester value of said mixture being from about 0.5 to 2.0.

8. A composition consisting essentially of a mixture of sorbide monoester of a fatty acid having at least 6 carbon atoms and the other esters produced in the anhydridization-esterification reaction of a mixture of sorbitol and hexane pentols, and the said fatty acid with at least 6 carbon atoms under conditions promoting esterification with said fatty acid and anhydridization of said mixture, the said mixture after esterification having a ratio of fatty acid equivalents to carbon atoms of the residue of said mixture of from about 0.15 to 0.25, and the ratio of hydroxyl value to ester value of said mixture after esterification being from about 0.5 to 2.0.

9. A composition consisting essentially of a mixture of hexide monoester of a fatty acid having at least 6 carbon atoms and the other esters produced in the reaction of a polyhydroxylic material selected from the class consisting of hexitols, hexitans, hexides, and mixtures of hexitols and hexane pentols, with the said fatty acid of at least 6 carbon atoms, said fatty acid being reacted with said polyhydroxylic material in the ratio of substantially 1 equivalent of said fatty acid to 6 carbon atoms of said polyhydroxylic material, and the ratio of hydroxyl value to the ester value of said mixture being about 1.

10. A composition consisting essentially of a mixture of hexide monoester of a fatty acid derivable from a substance selected from the class consisting of animal oils, animal fats, vegetable oils and vegetable fats, and the other esters produced in the esterification reaction of a polyhydroxylic material selected from the class consisting of hexitols, hexitans, hexides, and mixtures of hexitols and hexane pentols, with the said fatty acid, the said mixture having a ratio of fatty acid equivalents to carbon atoms of the polyhydroxylic residue of from about 0.15 to 0.25, and the ratio of hydroxyl value to ester value of said mixture being from about 0.5 to 2.0.

11. A composition consisting essentially of a mixture of mannide monooleate and the other esters produced in the anhydridization-esterification reaction of mannitol and oleic acid in substantially mol for mol ratio at elevated temperature and in the presence of an acidic catalyst, the ratio of the hydroxyl value to the ester value of the mixture being about 1.

12. An emulsifier consisting essentially of a hexide monoester of a fatty acid having at least 6 carbon atoms.

13. An emulsifier consisting essentially of a mixture of a hexide monoester of a fatty acid having at least 6 carbon atoms and the other esters produced in the reaction of a polyhydroxylic material selected from the group consisting of hexitols, hexitans, hexides, and mixtures of hexitols and hexane pentols, and the said fatty acid with at least 6 carbon atoms, said mixture having a ratio of fatty acid equivalents to carbon atoms of polyhydroxylic residue of from about 0.15 to 0.25, and the ratio of hydroxyl value to ester value of said mixture being from about 0.5 to 2.0.

14. An emulsifier consisting essentially of a mixture of a hexide monoester of a fatty acid with at least 6 carbon atoms and the other esters produced in the reaction of a polyhydroxylic material selected from the class consisting of hexitols, hexitans, hexides, and mixtures of hexitols and hexane pentols, with the said fatty acid with at least 6 carbon atoms, said fatty acid being reacted with said polyhydroxylic material in the ratio of substantially 1 equivalent of said fatty acid to 6 carbon atoms of said polyhydroxylic material, and the ratio of hydroxyl value to the ester value of said mixture being about 1.

15. An emulsifier consisting essentially of a hexide monoester of a fatty acid derivable from a substance selected from the class consisting of animal oils, animal fats, vegetable oils and vegetable fats, and the other esters produced in the esterification reaction of a polyhydroxylic material selected from the class consisting of hexitols, hexitans, hexides, and mixtures of hexitols and hexane pentols, with the said fatty acid, the said mixture having a ratio of fatty acid equivalents to carbon atoms of the polyhydroxylic residue of from about 0.15 to 0.25, and the ratio of hydroxyl value to ester value of said mixture being from about 0.5 to 2.0.

16. An emulsifier consisting essentially of a mixture of mannide monoester of a fatty acid having at least 6 carbon atoms and the other esters produced in the anhydridization-esterification reaction of mannitol and the said fatty acid with at least 6 carbon atoms under conditions promoting both esterification with said acid and anhydridization of said mannitol, said mixture having a ratio of fatty acid equivalents to carbon atoms of mannitol residue of from about 0.15 to 0.25, and the ratio of hydroxyl value to ester value of said mixture being from about 0.5 to 2.0.

17. An emulsifier consisting essentially of a mixture of sorbide monoester of a fatty acid having at least 6 carbon atoms and the other esters produced in the anhydridization-esterification reaction of sorbitol and said fatty acid with at least 6 carbon atoms under conditions promoting both esterification with said acid and anhydridization of said sorbitol, said mixture having a ratio of fatty acid equivalents to carbon atoms of sorbitol residue of from about 0.15 to 0.25, and the ratio of hydroxyl value to ester value of said mixture being from about 0.5 to 2.0.

18. An emulsifier consisting essentially of a mixture of mannide monooleate and the other esters produced in the anhydridization-esterification reaction of mannitol and oleic acid in substantially mol-for-mol ratio at elevated temperature and in the presence of an acidic catalyst, the ratio of the hydroxyl value to the ester value of the mixture being about 1.

KENNETH R. BROWN.